Oct. 22, 1968  H. GOTZ  3,406,622

VENTILATION MEANS FOR PASSENGER MOTOR VEHICLES

Filed Aug. 1, 1966

INVENTOR
HANS GÖTZ

BY Dicke + Craig
ATTORNEYS

United States Patent Office 3,406,622
Patented Oct. 22, 1968

3,406,622
VENTILATION MEANS FOR PASSENGER
MOTOR VEHICLES
Hans Gotz, Backnang-Stockenhof, Germany, assignor to
Daimler - Benz Aktiengesellschaft, Stuttgart-Unterturk-
heim, Germany
Filed Aug. 1, 1966, Ser. No. 569,369
Claims priority, application Germany, Aug. 4, 1965,
D 47,894
15 Claims. (Cl. 98—2)

ABSTRACT OF THE DISCLOSURE

A motor vehicle body having provisions for ventilation of the passenger space and for prevention of fogging of the rear window, including a channel-shaped rain ledge provided along the rim of the top of the vehicle body above the side windows and behind the rear edge of the side windows, a series of apertures within the body panels in the area of the rear support column, said apertures being positioned directly behind the rain ledge, a channel formed along the bottom of the rear window, a series of slots venting said channel into the passenger space, and air ducts providing communication between the channel and the series of apertures.

---

The present invention relates to a motor vehicle, especially a passenger motor vehicle, with an installation for the ventilation of the passenger space and with channel-shaped rain moldings, ledges or the like extending along the rim of the top, preferably delimiting the upper portion of the side windows.

In motor vehicles having rain moldings or ledges arranged in this manner, there is formed during the drive a region of high static vacuum or under-pressure within a narrow area directly to the rear of the rain molding at the windshield column, at the center wall column and also at the rear column because the rain moldings or ledges constitute, as seen in the driving direction, projections unfavorable from a flow technical point of view, to the rear of which a vacuum is created, as known, as a result of the separation or detachment of the laminar flow. The present invention now utilizes this recognition in order to solve the problem to achieve a draft-free ventilation of the passenger space, by means of which discomforts of the passengers are avoided. Additionally, the present invention is also concerned with preventing the undesirable fog formation, especially of the rear window which could not be achieved, for example, by the rotary windows known to date generally laterally adjoining the windshield which assures partly a sufficient ventilation of the forward passenger space.

The present invention essentially consists in that apertures are provided in the outer panels of the body at the columns carrying the top within the area which lies directly to the rear of the rain molding or ledge as seen in the driving direction, which apertures connect the passenger space with the free atmosphere surrounding the vehicle. Conditioned by the pressure difference between the passenger space and the area in which are provided the apertures, an airstream is effected from the inside toward the outside which assures an adequate ventilation of the passenger space. Furthermore, the advantage is achieved by the present invention that even with an opened sliding roof and with opened side windows as well as with opened forward rotary or pivotal windows, a back-flow of the air from the outside toward the inside is prevented. Measurements have indicated that the static pressure condition, i.e., the ratio of the static pressure on the inside of the passenger space to the dynamic pressure with opened sliding roof and side windows less between −0.5 and −0.6. However, directly to the rear of the rain molding the static pressure ratio amounts to between −0.8 and −0.9. It can be readily seen from these values that even with an opened sliding roof and with opened side windows, no air stream can occur from the outside toward the inside, thus precluding undesirable drafts.

In one advantageous construction of the present invention, the apertures may be provided in the outer cover panels of the body at the rear columns. Furthermore, the passenger space may be in communication appropriately with an air duct or guide channel which terminates into the atmosphere by way of the aforementioned apertures. This air duct or guide channel may commence in a particularly advantageous manner at the lower edge of the rear window and may consist of a transverse channel arranged at the lower edge of the rear window as well as of channels present in the rear columns. The arrangement may be constructed in a particularly simple manner if the rear columns are constructed hollow and serve as portions of the air guide channels, and if the cross channel at the lower edge of the rear window is constituted in part by angularly bent portions of the sheet metal body parts or panels. By the use of such a construction, an air stream is produced on the inside of the vehicle which flows or sweeps along the rear window and therewith prevents fogging of this window pane. In order to achieve a particularly uniform air stream in the passenger space. it is advantageous if the cross channel disposed at the lower edge of the rear window is provided with slots which terminate in the passenger space, and if these slots are distributed nearly over the entire width of the rear window. It is possible in this manner to protect the entire rear window against fogging.

Accordingly, it is an object of the present invention to provide a motor vehicle, and more particularly a passenger motor vehicle having a ventilating system which avoids by extremely simple means the aforementioned shortcomings and drawbacks encountered in the prior art constructions.

Another object of the present invention resides in a ventilating system for passenger motor vehicles which assures an adequate ventilation of the entire passenger space without the danger of producing drafts.

A further object of the present invention resides in a motor vehicle, especially passenger motor vehicle having a ventilating system which effectively prevents fogging of the rear window.

Still another object of the present invention resides in a ventilation system for passenger motor vehicles which produces an airstream from the inside toward the outside that assures adequate ventilation of the passenger space and eliminates the danger of draft even with open side windows and sliding roof.

These and further objects, features and advantages of the present invention will become more obvious from the following description when taken in connection with the accompanying drawing which shows, for purposes of illustration only, one embodiment in accordance with the present invention, and wherein.

Figure 1:
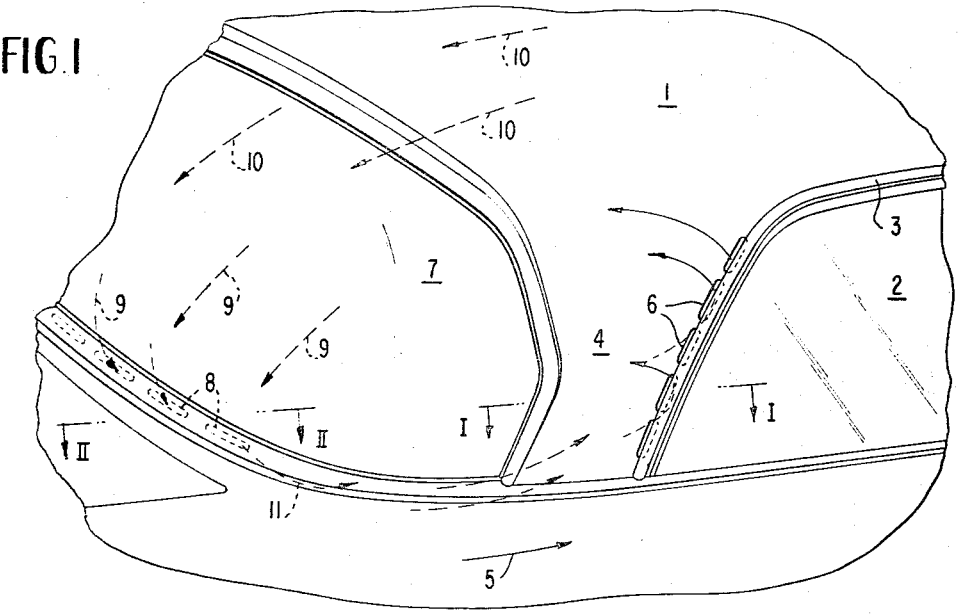
FIGURE 1 is a partial perspective view of a motor vehicle top within the area of the rear column.

Referring now to the drawing wherein like reference numerals are used throughout the various views to designate like parts, and more particularly to FIGURE 1, reference numeral 1 designates therein a top for a passenger motor vehicle. A rain molding or ledge 3 is placed along the rim of the vehicle top 1 about the upper part of the side window 2. The rain molding 3 is constructed of channel shape and is intended to prevent the water, which flows down from the roof 1 during a rain, from flowing off along the lateral windows 2. Several apertures 6 are provided in the outer cover panels of the body at the rear column 4 within the area directly to the rear of the rain molding 3 as seen in the driving direction which is indicated by arrow 5. The apertures 6 are in communication with the interior space of the vehicle. This communication is realized by means of an air guide or conduction channel, not visible in this figure, which begins at the bottom edge of the rear window 7 at the slots 8 disposed on the vehicle inside and indicated in FIGURE 1 in dash line and which leads within the vehicle body to the apertures 6. Since a strong vacuum or underpressure is formed during the drive within the area to the rear of the rain molding or ledge 3, within which are located the apertures 6, air flows out of the passenger space in the direction of the arrows 9 and 10 along the ceiling of the passenger space and along the rear window 7 and into the slots 8, subsequently flows within the air guide channel in the direction of arrow 11 toward the apertures 6 and leaves thereat into the atmosphere.

Figure 2:
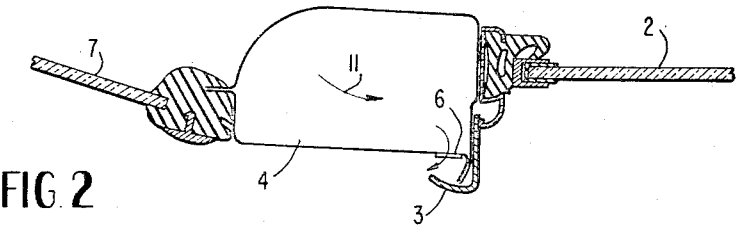
FIGURE 2 is a horizontal cross-sectional view through the rear column of FIGURE 1, taken along line I—I of FIGURE 1.

It may be seen from FIGURE 2 that the rear column 4 is constructed as hollow column and serves as a portion of the air guide channel, within which is guided the air arriving in the direction of arrow 11 which thereupon leaves through the apertures 6.

Figure 3:
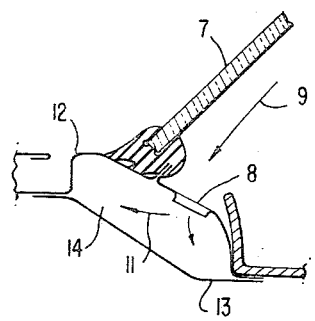
FIGURE 3 is a vertical cross-sectional view through the lower edge of the rear window in FIGURE 1, taken along line II—II of FIGURE 1.

The further section of the air guide channel at the bottom edge of the rear window 7 is illustrated in cross section in FIGURE 3, which is constructed in part by the angularly bent portions of the sheet metal body panels 12 which together with a further sheet metal member 13 form a hollow channel that is connected with the passenger space by way of the slots 8. Consequently, the air predominantly sweeps during the drive along the upper side of the passenger space toward the rear, thereupon in the direction of the arrows 9 along the rear window 7, sweeps the rear window over the entire width as the slots 8 are provided nearly over the entire width of the rear window 7, and then flows through the slots 8 into the cross channel 14 provided at the lower edge of the rear window 7 where the air stream is divided in the direction toward both rear columns 4. The cross channel 14 terminates on both sides of the vehicle in the hollow rear columns 4 so that the air flows out of the passenger space in the direction of the arrows 11 from the cross channel 14 into both hollow rear columns 4 and from there is discharged through the apertures 6.

A particularly simple and effective, as well as draft-free, ventilation of the passenger space is possible by the present invention which can be installed also with already existing motor vehicles as most motor vehicles are already so constructed that the measures according to the present invention can be carried out easily.

While I have shown and described one embodiment in accordance with the present invention, it is understood that the same is not limited thereto but is susceptible of numerous changes and modifications as known to a person skilled in the art, and I therefore do not wish to be limited to the details as shown and described herein but intend to cover all such changes and modifications as are encompassed by the scope of the appended claims.

I claim:

1. A motor vehicle, especially passenger motor vehicle having a body with outer body panels, comprising a top defining in part a passenger space and including at least a roof portion, lateral and rear window means, channel-shaped rain molding means extending along at least a portion of the rim of the top including that portion thereof which extends behind the rear edge of the lateral window means in the area of the column means, column means supporting the roof portion, and means for ventilating the passenger space including aperture means provided in the outer body panels of the motor vehicle within the area of the column means, as seen in the driving direction, substantially directly to the rear of the rain molding means said aperture means extending through the outer body panels substantially at right angles to the direction of travel of the vehicle and being positioned within the channel of said rain molding means, and air guide means providing for communication between the passenger space and said aperture means.

2. A motor vehicle according to claim 1, wherein said air guide means includes air guide channel means in communication with the passenger space and terminating in the outside atmosphere by way of the aperture means located in the rear column means.

3. A motor vehicle according to claim 2, wherein said air guide channel means starts substantially at the lower edge of the rear window means.

4. A motor vehicle according to claim 3, wherein said air guide channel means includes a cross channel arranged at the lower edge of the rear window means and channels present in the rear column means.

5. A motor vehicle according to claim 4, wherein said rear column means are constructed hollow and serve as sections of the air guide channel means.

6. A motor vehicle according to claim 5, wherein said cross channel located at the lower edge of the rear window means is constituted in part by angularly bent sections of the body panels.

7. A motor vehicle according to claim 6, wherein the cross channel located at the lower edge of the rear window means is provided with slot means terminating in the passenger space.

8. A motor vehicle according to claim 7, wherein said slot means are distributed in the cross channel nearly over the entire width of the rear window means.

9. A motor vehicle according to claim 1, wherein said ventilating means includes air guide channel means in communication with the passenger space and terminating in the outside atmosphere by way of the aperture means located in the rear column means.

10. A motor vehicle according to claim 9, wherein said air guide channel means starts substantially at the lower edge of the rear window means.

11. A motor vehicle according to claim 10, wherein said air guide channel means includes a cross channel arranged at the lower edge of the rear window means and channels present in the rear column means.

12. A motor vehicle according to claim 11, wherein said cross channel located at the lower edge of the rear window means is constituted in part by angularly bent sections of the body panels.

13. A motor vehicle according to claim 11, wherein the cross channel located at the lower edge of the rear window means is provided with slot means terminating in the passenger space.

14. A motor vehicle according to claim 13, wherein said slot means are distributed in the cross channel nearly over the entire width of the rear window means.

15. A motor vehicle according to claim 9, wherein said rear column means are constructed hollow and serve as sections of the air guide channel means.

References Cited

UNITED STATES PATENTS

| | | | |
|---|---|---|---|
| 2,529,994 | 11/1950 | Brezek | 98—2 |
| 3,059,561 | 10/1962 | Wilfert | 98—2 |
| 3,202,076 | 8/1965 | Fieni | 98—2 |
| 3,259,051 | 7/1966 | Boche | 98—2 |

MEYER PERLIN, *Primary Examiner.*

Disclaimer and Dedication

3,406,622.—*Hans Gotz*, Backnang-Stockenhof, Germany. VENTILATION MEANS FOR PASSENGER MOTOR VEHICLES. Patent dated Oct. 22, 1968. Disclaimer and dedication filed July 28, 1972, by the assignee, *Daimler-Benz Aktiengesellschaft*.

Hereby disclaims and dedicates to the Public the entire term of said patent.

[*Official Gazette May 27, 1975.*]